United States Patent [19]
Kawanishi

[11] Patent Number: 5,910,646
[45] Date of Patent: Jun. 8, 1999

[54] QUANTITATIVE CHARGING APPARATUS

[75] Inventor: Shozo Kawanishi, Hyogo, Japan

[73] Assignee: Yamato Scale Co., Ltd., Hyogo, Japan

[21] Appl. No.: 08/628,491

[22] Filed: Apr. 5, 1996

[30] Foreign Application Priority Data

Apr. 6, 1995 [JP] Japan ................................ 7-081034
May 19, 1995 [JP] Japan ................................ 7-121302

[51] Int. Cl.$^6$ ............................................. G01G 13/00
[52] U.S. Cl. .................................................. 177/25.18
[58] Field of Search ...................................... 177/25.18

[56] References Cited

U.S. PATENT DOCUMENTS

| | | | |
|---|---|---|---|
| 4,534,480 | 8/1985 | Steel | 177/25.18 |
| 4,828,054 | 5/1989 | Mosher | 177/25.18 |
| 4,901,807 | 2/1990 | Muskat et al. | 177/25.18 |
| 5,048,623 | 9/1991 | Toyoda | 177/25.18 |

FOREIGN PATENT DOCUMENTS

| | | | |
|---|---|---|---|
| 0 097 532 | 1/1984 | European Pat. Off. | G01G 19/32 |
| 2 227 965 | 1/1974 | Germany . | |
| 35 40 165 A1 | 5/1987 | Germany | G01G 13/08 |
| 270 978 A1 | 8/1989 | Germany | G01G 23/12 |
| 50-120660 | 9/1975 | Japan . | |
| 62-9226 | 1/1987 | Japan . | |

*Primary Examiner*—Randy W. Gibson
*Attorney, Agent, or Firm*—Senniger, Powers, Leavitt & Roedel

[57] ABSTRACT

A quantitative charging apparatus of the present invention comprises a large charging storage cup and a plurality of additive storage cups having different capacity ratios in which articles are filled with even cupfuls. The capacity of the large charging storage cup is set so as to store the articles having a weight which is smaller than and close to a target weight. The articles within the large charging storage cup is weighed by a load cell to obtain a large charging weight, and the weights of the articles within the additive storage cups are weighed by other load cells. A control device finds, as an underweight, the difference between the large charging weight and the target weight, and selects the suitable combination of the additive storage cups having capacities which are close to the underweight. The articles within the selected additive storage cups are supplied into a container together with the articles within the large charging storage cup through a chute. In addition, a plurality of additive auxiliary cups may be provided. In this case, if the maximum capacity of the additive storage cups is $V_{max}$, the reference value of the bulk density of the articles is d, and the maximum dispersion ratio of the bulk densities is Z, the capacities of the additive storage cups and additive auxiliary cups are determined in such a manner that the total weight of the articles within the additive auxiliary cups is the closest to $2ZdV_{max}$.

12 Claims, 7 Drawing Sheets

QUANTITATIVE CHARGING APPARATUS

FIELD OF THE INVENTION

The present invention relates to a quantitative charging apparatus for feeding articles having great variations in volumetric weight into a storage cup of a predetermined capacity so that quantitative charging is performed, and more particularly to a quantitative charging apparatus comprising a large charge storage cup for storing a large or bulk charge of articles, a plurality of additive storage cups having different capacities for storing additive charges to make up an underweight, and additive auxiliary cups which can be used if necessary, so that it is possible to provide a more accurate weight relative to a target weight within a wide range.

PRIOR ART

Quantitative charging of powdery or granular articles has a long tradition. Of constant quantity filling methods, volumetric weighing is a method which has been widely adopted. However, volumetric weighing has been gradually replaced with weighing by weight. The main reason is that it has become necessary to weigh a chemical compound more accurately, for example. This is a problem which has not been very important for weighing agricultural products such as rice and wheat in the past. FIG. 9 shows a typical example of a conventional quantitative charging apparatus for powder.

In the quantitative charging apparatus of FIG. 9, a target weight is set by a 100% setter 51, 90% of the target weight is set as a cut value by a cut value setter 52, and articles are supplied into a weighing hopper 53 while weighing them. To shorten a weighing time as much as possible in this apparatus, it is necessary to perform charging with an increasing feeding rate which is realized by increasing the amplitude of a feeder 55 until up to 90% of a predetermined quantity is fed to hopper 53. This is called "large or bulk quantity charging", "rough charging" or "90% charging". When a charging quantity reaches about 90%, the amplitude of the feeder 55 is decreased under the control of a control device 56, and fine charging is then performed for the remaining 10% so charging is stopped when 100% of the target weight is reached. Such fine charging is called "small or double quantity charging". Upon completion of charging, the articles are filled into a container (not shown) from a lower portion of the weighing hopper 53. The quantitative charging apparatus of this type performs weighing while supplying the articles, and does not increase charging speed.

In order to solve these problems, Japanese Laid-Open Patent Nos. 50-120660 and 62-9226 have disclosed a quantitative charging apparatus in which a charging speed can be enhanced. According to the quantitative charging apparatus of this type, articles whose weights are smaller than and close to a target weight are stored in a large charge storage cup, and a plurality of auxiliary cups having the same capacities are provided for making up the underweight. Such an apparatus performs quantitative charging by utilizing a variation in the weight of the articles stored in each auxiliary cup. More specifically, an underweight is obtained by subtracting the weight of the articles stored in the large charging storage cup from the target weight, and a combination of auxiliary cups is selected having combined capacities which are the closest to the underweight. Thus, a plurality of auxiliary cups having the same capacities are provided so that articles having a weight close to the target weight can be delivered to a container. The quantitative charging apparatus of this type does not perform weighing while the storage cups are being filled. Consequently, the charging speed can be increased.

However, the quantitative charging apparatus described above has the following problem. In the case where the weight of the articles to be supplied into the large charging storage cup has a great variation, may be impossible to make up the underweight even if all the auxiliary cups are selected. In order to solve this problem, the size of the auxiliary cup may be increased. In some cases, however, the large size of the auxiliary cups may make it impossible to find a combination of weights which will provide an acceptable weight within the allowable range. This is because the large size of the cups prevents fine (precise) adjustment of the weight. In order to solve this problem, the size of the auxiliary cup may be decreased. In some cases, however, the underweight cannot be made up even if all the auxiliary cups are selected. Accordingly, many auxiliary cups should be provided.

The present invention solves these problems associated with the prior art. It is an object of the present invention to provide a quantitative charging apparatus capable of controlling and more finely (precisely) adjusting the weight of articles within a wide range, and capable of performing high-speed charging.

SUMMARY OF THE INVENTION

The present invention provides a quantitative charging apparatus comprising a large (bulk) charge storage cup for storing articles having a weight which is smaller than and close to a target weight $W_o$, a plurality of additive storage cups which store the articles for additive charging and have at least two different capacities, first weighing means for weighing, as a large (bulk) charge weight $W_a$, the articles supplied into the large charge storage cup, a plurality of second weighing means provided in the additive storage cups for weighing the articles supplied into the additive storage cups respectively, and control means for determining, as an underweight $W_b$, a difference $(W_o-W_a)$ between the target weight $W_o$ and the large charging weight $W_a$, selecting the combination of the additive storage cups having capacities which are the closest to the underweight $W_b$ based on the weights of the articles stored in the additive storage cups which are obtained by the second weighing means, and discharging the articles within the selected additive storage cups together with the articles within the large charge storage cup.

Furthermore, at least part of the additive storage cups may have a capacity ratio of $$1:r^1:r^2:\ldots :r^{k-1}:\ldots :r^{n-1}$$

(r is a positive real number, 0<k (integer)<=n, n<=the number of the additive storage cups). In addition, the positive real number r may be 2.

The quantitative charging apparatus according to the present invention comprises a large (bulk) charge storage cup for storing large charges and a plurality of additive storage cups for storing additive charges to make up the large charge. The capacity of the large charge storage cup is set so as to store articles having a weight which is smaller than and close to the target weight $W_o$. Furthermore, the additive storage cups have at least two different capacities, and divide the articles for additive charging into a plurality of different capacities for storage. The articles can be supplied into the large charge storage cup and the additive storage cups at almost the same time.

The articles supplied into the large charge storage cup are weighed by first weighing means to have a large charge weight $W_a$. The additive storage cups have second weighing means respectively. The articles for additive charging which are stored in the additive storage cups are weighed by the second weighing means respectively. The articles can be weighed by the first and second weighing means almost simultaneously.

Control means determines an underweight $W_b$, $W_o-W_a$ by subtracting the large (bulk) charge weight $W_a$ obtained by the first weighing means from the target weight $W_o$. Since the capacity of the large charge storage cup is set to store articles having a weight smaller than the target weight, are stored, the underweight $W_b$ always has a positive value. Then, the control means selects the combination of additive storage cups having capacities which are closest to the underweight $W_b$ based on the weights of articles within the additive storage cups obtained by the second weighing means respectively, and effects the discharge of the articles within the selected additive storage cups and within the large charge storage cup.

The calculation for obtaining the underweight $W_b$ and selection of the combination of additive storage cups can be performed instantly by a computer or the like. Consequently, high-speed charging can be realized. Since the quantitative charging apparatus of the present invention comprises a plurality of additive storage cups having at least two different capacities, the weight of the articles can be controlled and adjusted more finely (precisely) within a wide range.

Furthermore, the capacity ratio of n additive storage cups (n<=the number of additive storage cups) is set to $$1:r^1:r^2:\ldots:r^{k-1}:\ldots:r^{n-1}$$

so that the weight of the articles can be controlled and adjusted much more finely (precisely) within a wider range. More specifically, if the positive real number r is set to 2 in the above expression, the weight can be controlled and adjusted more precisely within the wide range.

In the embodiment described above, if the bulk densities of the articles within the additive storage cups 4a to 4e vary in the different directions, with respect to a reference bulk density articles cannot be precisely adjusted within a wide range. However, a different embodiment for the quantitative charging apparatus of the present invention may be equipped with structure which permits more precise adjustment within a wide range even if the bulk densities of the articles are changed. In this embodiment, the quantitative charging apparatus comprises a large charge storage cup provided with weighing means for storing articles having a weight which is smaller than and close to a target weight, a plurality of additive storage cups provided with weighing means the additive storage cups having at least two different capacities for storing articles for additive charging so as to make up the underweight obtained by subtracting the weight of the articles within the large charge storage cup from the target weight, a control device for selecting a combination of additive storage cups to stepwise (incrementally) change the weight of articles for additive charging according to a predetermined charge weight difference, and one or a plurality of additive auxiliary cups provided with weighing means for correcting a gap in the charge weight difference caused by a variation in bulk density of the articles for additive charging which is stepwise (incrementally) changed depending on the change of the combination when the combination of the additive storage cups is selected by the control device.

The quantitative charging apparatus according to the present invention may have a structure in which the additive storage cups include at least m additive storage cups having the following capacity:

$$a, as^1, as^2, \ldots, as^{k-1}, \ldots, as^{n-1}$$

a: the capacity of additive storage cup as a reference
s: a positive real number
0<k (integer)<=m, m<=the number of additive storage cups.

Furthermore, the quantitative charging apparatus according to the present invention may have a structure in which the additive auxiliary cups include at least p additive auxiliary cups having the following capacity.

$$b, bt^1, bt^2, \ldots, bt^{k-1}, \ldots, bt^{p-1}$$

b: the capacity of additive auxiliary cup as a reference
t: a positive real number
0<k (integer)<=p In the quantitative charging apparatus according to the present invention, the positive real numbers t and s may be equal to each other.

Furthermore, the positive real numbers t and s may be 2.

The quantitative charging apparatus according to another embodiment of the present invention may have a structure in which when the maximum dispersion (variation) ratio of the bulk densities of the articles within the additive storage cups is Z, the maximum volume of the m additive storage cups is $V_{max}$ and the total capacity of the p additive auxiliary cups is A, the number p of additive auxiliary cups is an integer which satisfies the following equation:

$$2ZV_{\max} = 2Z2^{m-1}a < A = b\sum_{k=1}^{p} 2^{k-1}$$

The quantitative charging apparatus according to this embodiment the present invention can include a structure in which the large charge storage cup comprises a main charge storage cup and a subtractive auxiliary cup having weighing means respectively, the subtractive auxiliary cup holding articles without discharge so that the charge weight difference is decreased.

The quantitative charging apparatus according to the present invention can add a structure in which the additive auxiliary cup is a single cup, and the additive auxiliary cup and the subtractive auxiliary cup have capacities which can store the articles having a weight of $(2ZdV_{max}-ad)$ to $(2ZdV_{max}+ad)$ when the maximum volume of additive storage cups is $V_{max}$.

The quantitative charging apparatus according to the present invention comprises a large charge storage cup for storing rough (bulk) charge of articles, that is a large charge of articles, and a plurality of additive storage cups having at least two different capacities for making up an underweight relative to a target weight. The large charge storage cup and the additive storage cups have weighing means respectively. The control device selects the combination of additive storage cups having capacities which are the closest to the underweight based on the weights of the articles within the additive storage cups obtained by the weighing means.

By changing the combination of additive storage cups which should be selected, the weight of articles for additive charging are stepwise (incrementally) changed according to a predetermined charge weight difference. However, if there is a variation in the bulk density of the articles in the additive storage cups a partial gap is caused on the charge weight difference of the articles due to the change of the combination of additive storage cups in some cases. The apparatus of the present invention comprises one or a plurality of additive auxiliary cups for correcting the gap in the charge weight difference. According to the selected combination of additive storage cups, if the charge weight difference is increased, the articles which should be supplied from the selected additive storage cups are partially replaced with the articles supplied from the additive auxiliary cups so that the underweight is made up. The number and capacities of additive auxiliary cups are determined in consideration of the dispersion ratio of the bulk densities of the articles.

In the apparatus of the present invention, the additive storage cups may include at least m additive storage cups having a capacity expressed as follows:

$$a, as^1, as^2, \ldots, as^{k-1}, \ldots, as^{m-1}$$

a: the capacity of additive storage cup as a reference
s: a positive real number
$0 < k$ (integer) $<= m$, $m <=$ the number of additive storage cups According to such a structure, the combination of the additive storage cups is changed so that the underweight can be made up at almost regular intervals. Consequently, it is possible to decrease the capacity of additive auxiliary storage cup which corrects the gap in the charge weight difference of the articles for addition.

In the apparatus of the present invention, the additive storage cups may include at least p additive auxiliary cups having a capacity expressed as follows:

$$b, bt^1, bt^2, \ldots, bt^{k-1}, \ldots, bt^{p-1}$$

b: the capacity of additive auxiliary cup as a reference
t: a positive real number
$0 < k$ (integer) $<= p$ According to the structure of the auxiliary cup, the gap in the charge weight difference caused by the variation in bulk density of the articles can be made up at almost regular intervals.

When the positive real numbers t and s are equal to each other and set to 2, the same effects can be obtained by the comparatively simple structure.

In the apparatus having the structure in which the positive real numbers t and s are 2, the number p and capacities of additive auxiliary cups can be determined as follows. If the reference value of the bulk density of the articles within the additive storage cups is set to d and the maximum dispersion ratio of the bulk density of the articles is set to Z, a maximum charge weight difference $W_{max}$ is generated on the articles for additive charging when the articles having the maximum bulk density are supplied into the additive storage cup having the maximum capacity and the articles having the minimum bulk density are supplied into other additive storage cups. In other words, the maximum charge weight difference $W_{max}$ is obtained as follows:

$$W_{max} = a2^{m-1}(1+Z)d - a\sum_{k=1}^{m-1} 2^{k-1}(1-Z)d$$

$$= a2^{m-1}(1+Z)d - a(2^{m-1}-1)(1-Z)d$$

If $(2^{m-1})$ is nearly equal to $2^{m-1}$ and the maximum volume of the m additive storage cups is expressed by $V_{max}$, the following equation is obtained:

$$W_{max} \text{ nearly equals to } 2Zd(a2^{m-1}) = 2ZdV_{max}$$

In other words, the maximum charge weight difference $W_{max}$ which may be generated is twice as great as the weight of the articles whose bulk density has a reference value d that are supplied to the maximum capacity additive storage cup. If the total weight of the articles within the additive auxiliary cups is greater than the maximum charge weight difference $W_{max}$, it is possible to make up the maximum charge weight difference $W_{max}$ by selecting a combination of additive auxiliary cups. More specifically, if the total capacity of the p additive auxiliary cups is expressed by A, the following relationship should be obtained.

$$2V_{max}Zd < Ad = b\sum_{k=1}^{p} 2^{k-1}d$$

Accordingly, the following equation should be formed.

$$2ZV_{max} = < b\sum_{k=1}^{p} 2^{k-1}$$

According to another structure of the present invention, the large charge storage cup can be formed by a main charge storage cup and a subtractive auxiliary cup. In the apparatus having such a structure, the subtractive auxiliary cup holds the articles without discharge so that the maximum charge weight difference $W_{max}$ can be decreased.

Furthermore, the apparatus may have a structure (system) in which the capacity of the subtractive auxiliary cup is set so as to store the articles having a weight of $(2ZdV_{max}-ad)$ to $(2ZdV_{max}+ad)$. According to such a system, it is possible to perform correction so as to almost offset the maximum charge weight difference $W_{max}$.

These and other objects, features, aspects and advantages of the present invention will become more apparent from the following detailed description of the present invention when taken in conjunction with the accompanying drawings.

DETAILED DESCRIPTION OF THE INVENTION

Examples of the present invention will be described in detail with reference to the drawings.

(EXAMPLE 1)

Figure 1:
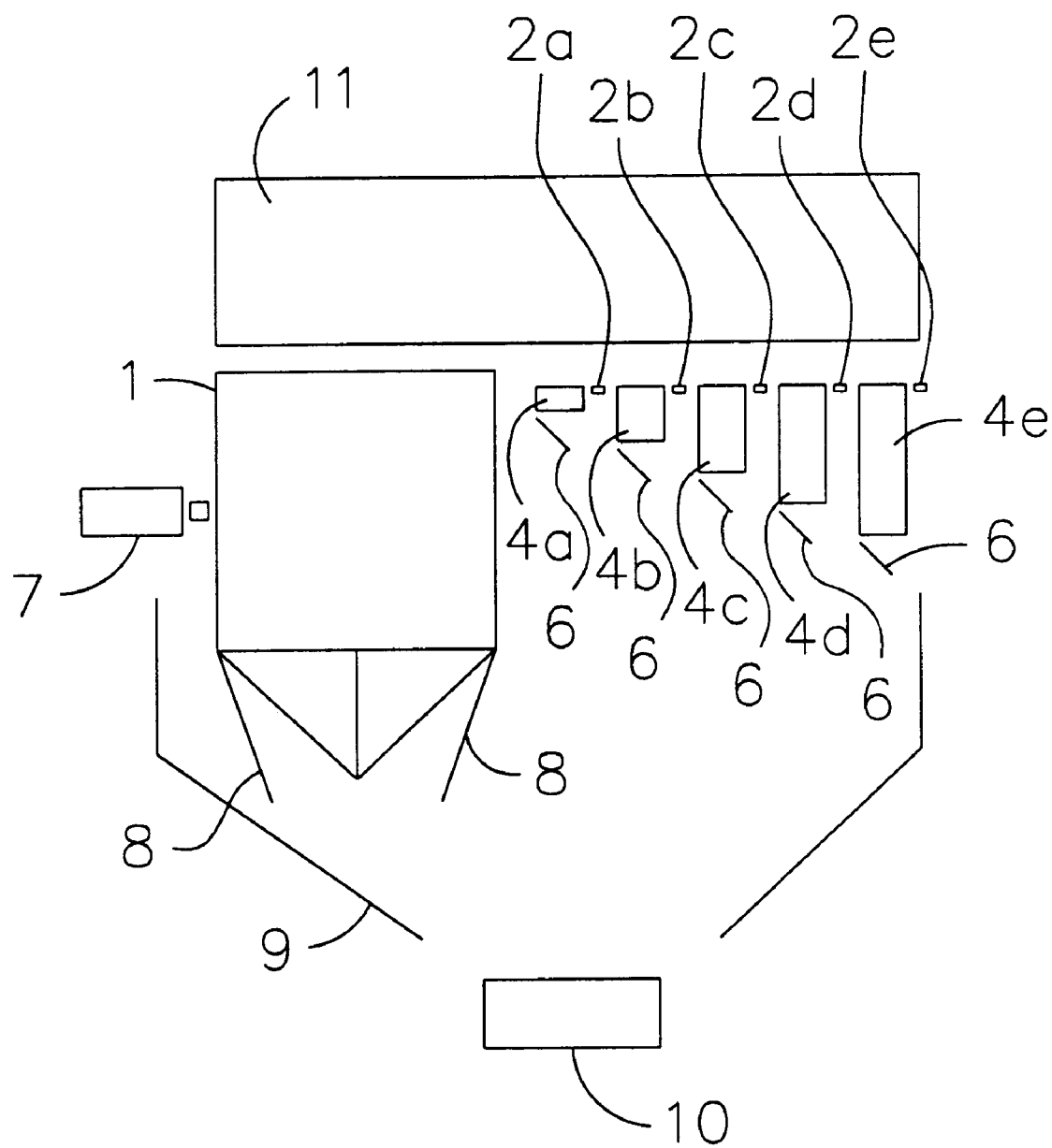
FIG. 1 is a schematic representation showing a first example of a quantitative charging apparatus according to the present invention.

FIG. 1 shows the schematic structure of a quantitative charging apparatus according to an example 1 of the present invention. The quantitative charging apparatus according to the present example is used to charge (load) a predetermined container such as a box or a bag with articles having a target weight $W_o$, and comprises a large (bulk) charge storage cup 1 and five additive storage cups 4a to 4e for storing articles. Articles are supplied from a charging apparatus 11 into the large charge storage cup 1 and the five additive storage cups 4a to 4e with even cupfuls (i.e., each cup 4a to 4e is filled up to but not higher than its brim) at almost the same time. The large charge storage cup 1 has a load cell 7. The articles supplied into the large charge storage cup 1 are weighed by the load cell 7. The five additive storage cups 4a to 4e have load cells 2a to 2e respectively by which the articles for additive charging are weighed. The outputs of the load cells 7 and 2a to 2e are input to a control device which has a circuit shown in FIG. 2.

A gate 8 for discharging the articles is disposed in a bottom portion of the large charge storage cup 1, while five gates 6 which open and close independently of each other are disposed in the additive storage cups 4e to 4e, respectively. The articles within the large charge storage cup 1 and the additive storage cups 4a to 4e are discharged into a container 10 such as a box or a bag through a chute 9. The gate 8 and the five gates 6 open and close under the control of the aforementioned control device.

A capacity ratio among the additive storage cups 4a to 4e is obtained by setting r=2 and n=5 in the expression $r^{k-1}$ (r is a positive real number, k<=n, n=the number of the additive storage cups), that is, 1:2:4:8:16.

Figure 2:
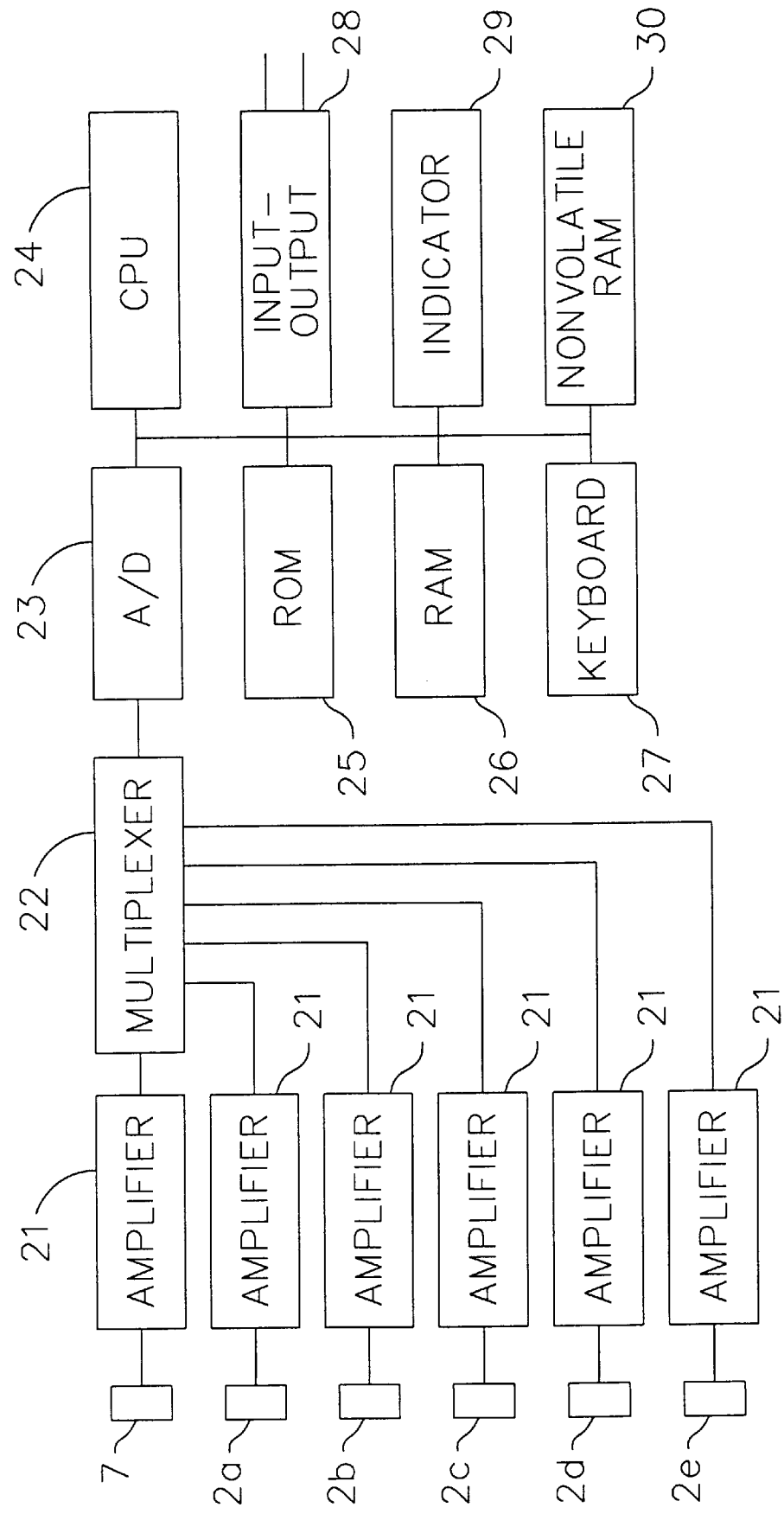
FIG. 2 is a circuit block diagram showing control means provided in the quantitative charging apparatus in FIG. 1.

As shown in a block diagram of FIG. 2, the output of the load cell 7 which weighs the articles supplied into the large charge storage cup 1 and the outputs of the load cells 2a to 2e which weigh the articles in the additive storage cups 4a to 4e, are amplified by amplifiers 21 and connected to a multiplexer 22. The multiplexer 22 switches the output of each amplifier 21 by time sharing. Then, the switched output is input to an A/D converter 23. The A/D converter 23 converts the input analog data to digital data to be processed by a CPU (central processing unit) 24. The CPU 24 performs processing according to a program stored in a ROM (read only memory) 25. In this case, a RAM (random access memory) 26 is temporarily used. Data such as a target weight $W_o$, the bulk density of the articles and the like are input to and stored in a nonvolatile RAM 30 through a keyboard 27. The opening and closing of the gate 8 and the five gates 6 based on the result of processing of the CPU 24 are controlled through an input-output 28. An indicator 29 indicates the weight of the articles in the large charge storage cup and additive storage cups, a value set to the nonvolatile RAM 30 and the like.

Figure 3:
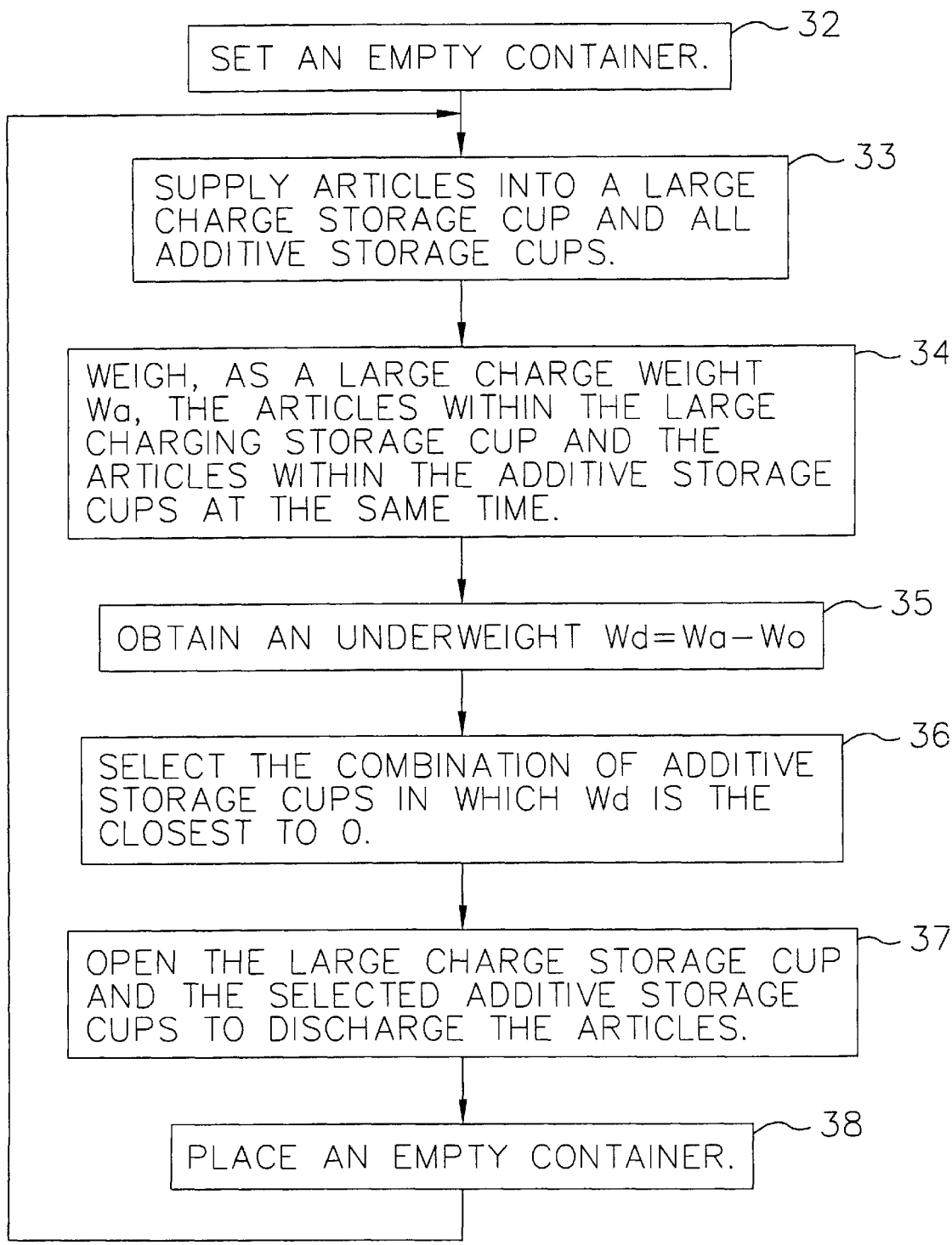
FIG. 3 is a flowchart showing the quantitative charging method which is performed by using the quantitative charging apparatus in FIG. 1.

The apparatus of the present example performs quantitative charging according to a flowchart shown in FIG. 3. At Step 32, the container 10 is placed below a lower portion of the chute 9. At Step 33, articles are supplied from the charging apparatus 11 to the large charge storage cup 1 and to the five additive storage cups 4a to 4e. At Step 34, the articles supplied to the large charge storage cup 1 are weighed as a large (bulk) charge weight $W_a$ by the load cell 7. At the same time, the articles supplied to the additive storage cups 4a to 4e are weighed by the load cells 2a to 2e.

At Step 35, an underweight $W_d = W_a - W_o$ is determined. At Step 36, a combination of additive storage cups yielding a combined weight of articles closest to the underweight $W_d$ is selected. At Step 37, the articles within the additive storage cups of the selected combination and the articles within the large charge storage cup 1 are then discharged into the container 10. The filled container is replaced with an empty container at Step 38, and the process is then repeated from Step 32.

According to the present example, the capacity ratio among the additive storage cups 4a to 4e is 1:2:4:8:16. This means that the articles in these cups have weights ranging from 1 to 31 times as great as that of the articles stored in the smallest additive storage cup 4a. Consequently, the weight of articles delivered to the container 10 can be controlled and adjusted finer (more precisely) within a wide range. The weighing of the large charge weight $W_a$ is performed simultaneously with that of the articles within each additive storage cup. In addition, the calculation for obtaining the underweight $W_d$ and the selection of, the combination of additive storage cups having combined capacities closest to the underweight $W_d$ are performed at a high speed by the CPU 24. Consequently, the charging speed is very high.

While five additive storage cups are described in the above example, the present invention is not restricted thereto and the number of additive storage cups can be varied. While a positive integer r is 2 has been described in the above example, the present invention is not restricted thereto and other integers or decimal numbers can be selected.

The quantitative charge apparatus according to the present invention comprises a large charge storage cup for large charge, and a plurality of additive storage cups having at least two different capacities for performing additive charging to make up the difference between the large charge and the target weight. Consequently, the weights of the articles can be controlled and adjusted finer (more precisely) within the wide range. Since the weighing of the large charge weight $W_a$ is performed simultaneously with that of the articles within the additive storage cups, the charging speed is very high. In addition, the calculation for obtaining the underweight $W_d$ and the selection of the combination of additive storage cups containing articles having combined weights closest to the underweight $W_d$ can be performed at a high speed by a computer or the like. Consequently, the charging speed is increased.

According to the apparatus shown in FIG. 1, if the bulk densities of the articles within all the additive storage cups 4a to 4e, vary in the same direction relative to a reference valve a difference in charging weight of the articles for addition which can be prepared by the combination of additive storage cups 4a to 4e is equal. For example, when the bulk density of the articles is the same as the reference bulk density, e.g. 1, all of the differences in charging weight of the articles are also 1. When the bulk density shifts to the plus direction, e.g. 1.1, all of the differences in charging weight of the articles are 1.1. Consequently, the underweight $W_d$ can be made up by additive charging within a capacity ratio of 1 to 31 irrespective of the value thereof. However, if the bulk density of the articles within the additive storage cups 4a to 4e, varies in different directions relative to the stated reference value the following problems arise. For example, assume that the bulk densities of the articles within the additive storage cups 4a to 4d (having a capacity ratio of 1:2:4:8) increase by 20%, and that the bulk density of the articles within the additive storage cup 4e (having a capacity ratio of 16) decreases by 20%. For simplicity, if the reference bulk density of the articles is 1, then the articles for addition contained in the combination of additive storage cups 4a to 4d (having a total capacity ratio of 15) have a weight of 1.2×15=18.0. The articles for addition contained in the additive storage cup 4e (having a capacity ratio of 16) have a weight of 0.8×16=12.8. The value of 12.8 can be made up by a combination of other additive storage cups 4a to 4d. Hence, the additive storage cup 4e has no significance.

Figure 4:
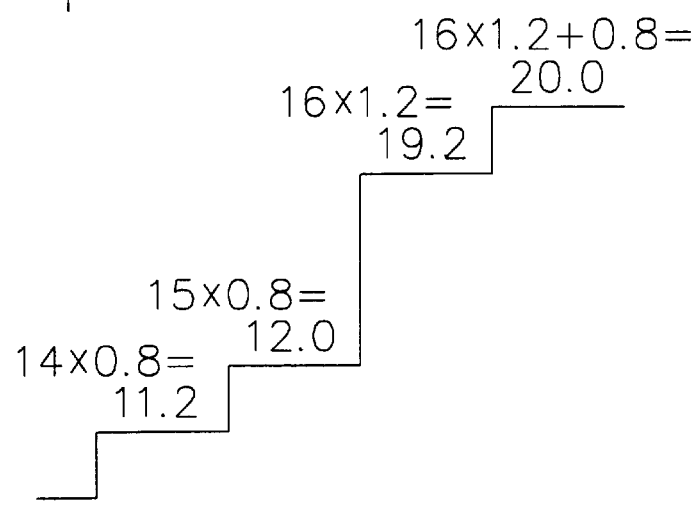
FIG. 4 is a diagram showing a large step increase (charging weight difference) between different additive charging weights due to variation in bulk density of the articles in additive storage cups of the quantitative charging apparatus in FIG. 1.

On the other hand assume that the bulk densities of the articles within the additive storage cups 4a to 4d decrease by 20% and that the bulk density of the articles within the additive storage cup 4e increases by 20%. In this case, the articles for addition contained in the combination of additive storage cups 4a to 4d (a total capacity ratio is 15) have a weight of 0.8×15=12.0. The articles for addition contained in the additive storage cup 4e (having a capacity ratio greater than that of the combined additive storage cups by 1) have a weight of 1.2×16=19.2. As shown in FIG. 4, the articles for addition which are prepared have weights of 11.2, 12.0, 19.2 and 20.0. The capacity ratio of 15 to 16 causes a very big difference in charge weight of 19.2−12.0=7.2 where the weights of the articles cannot be adjusted finer.

The following quantitative charging apparatus according to the present invention has a structure in which the weights of the articles can be adjusted finer within the wide range even if the bulk densities of the articles vary.

(EXAMPLE 2)

Figure 5:
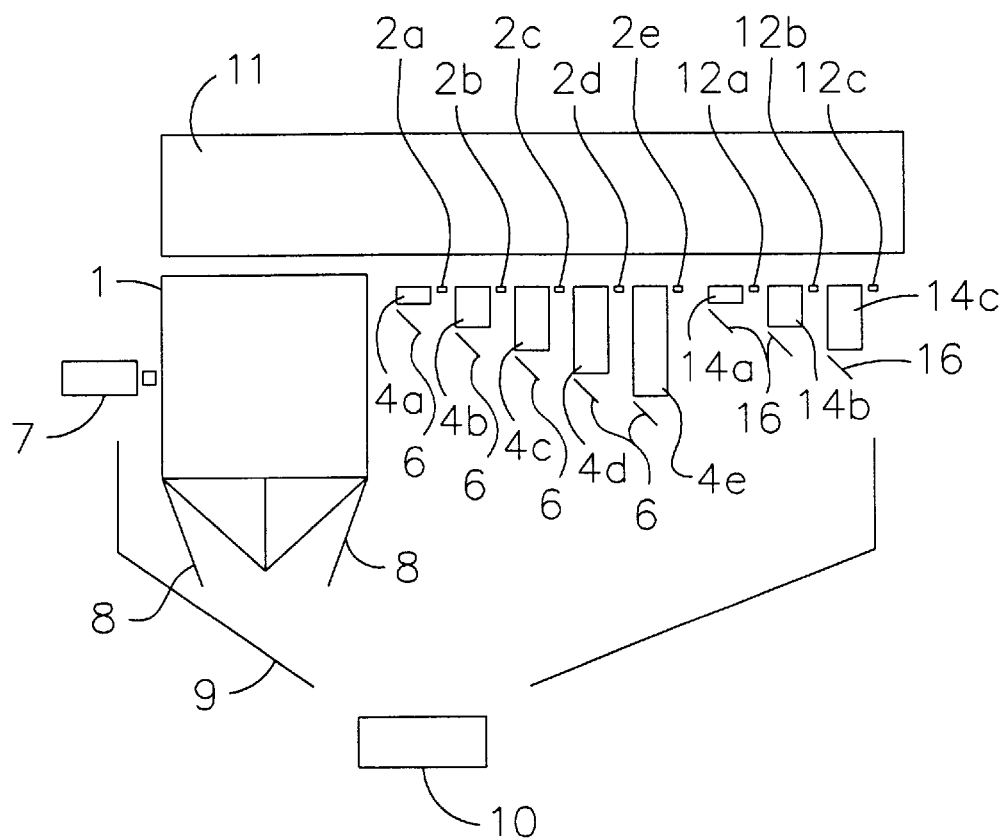
FIG. 5 is a schematic representation showing a second example of a quantitative charging apparatus having an additive auxiliary cup according to the present invention.

FIG. 5 shows the schematic structure of a quantitative charging apparatus according to an example 2 of the present invention. The quantitative charging apparatus according to the present example is used to charge a predetermined container such as a box or a bag with articles having a target weight $W_o$, and comprises a large charge storage cup 1 for storing a large (bulk) charge of articles, five additive storage cups 4a to 4e for additive charging, and three additive auxiliary cups 14a to 14c for correcting the charging weight difference. For example, articles are supplied from a charge apparatus 11 into the large charging storage cup 1, the additive storage cups 4a to 4e and the additive auxiliary cups 14a to 14c with even cupfuls (i.e., each cup 4a to 4e is filled up to but no higher than its brim) at almost the same time. The large charge storage cup 1 has a load cell 7. The articles which are supplied into the large charge storage cup 1 are weighed by the load cell 7. The five additive storage cups 4a to 4e have load cells 2a to 2e, respectively by which the articles for additive charging are weighed. According to the apparatus of the present example, furthermore, the additive auxiliary cups 14a to 14c have load cells 12a to 12c respectively. The outputs of the load cells 7, 2a to 2e and 12a to 12c are input to a control device (not shown).

A gate 8 for discharging the articles is disposed in a bottom portion of the large charge storage cup 1, while gates 6 and 16 which open and close independently of each other are disposed in the additive storage cups 4a to 4e and the additive auxiliary cups 14a to 14c respectively. The articles within the large charge storage cup 1, the additive storage cups 4a to 4e and the additive auxiliary cups 14a to 14c are discharged into a container 10 such as a box or a bag through a chute 9. The gates 8, 6 and 16 open and close under the control of the aforementioned control device which is not shown.

According to the present example, a capacity ratio among the additive storage cups 4a to 4e is obtained by setting s=2 and m=5 in the expression $s^{k-1}$ (s is a positive real number, k<=m, m=the number of additive storage cups), that is, 1:2:4:8:16. Accordingly, if the smallest additive storage cup 4a acts as a reference and has a capacity a, articles for additive charging having capacities of 1a to 31a $2^5-1$=31a) are prepared. If the bulk density of the articles has a reference (average) value d, a difference in charging weight of the articles for additive charging has a value ad. More specifically, if the bulk density has the reference value d, the articles for additive charging can be changed by ad.

A capacity ratio among the additive auxiliary cups 14a to 14c can be set by using an adequate positive real number t in the expression $t^{k-1}$ (t is a positive real number, 0<k (integer)<=p). According to this capacity ratio, the number p of additive auxiliary cups can be determined. According to the present example, t and s have the same values, i.e., t is set to 2, the smallest additive auxiliary cup 14a acts as a reference, and a capacity b is set to the capacity a of the smallest additive storage cup 4a. In this case, the weights of the articles within all the additive auxiliary cups are expressed by the following equation.

$$b\sum_{k=1}^{p} 2^{k-1} d = b(1 + 2 + \ldots + 2^{p-1})d$$

$$= bd(2^p - 1)$$

$$= ad(2^p - 1)$$

The number p of additive auxiliary cups is determined in such a manner that the combined weight of the articles within all the additive auxiliary cups is greater than 0.4×16 ad=6.4 ad in which the maximum dispersion ratio of the bulk densities of the articles Z=0.2, m=5 and s=2 are substituted for $(2dV_{max}=2Zdas^{m-1})$. In other words, the number p of additive auxiliary cups is 3(7 ad) according to the present example. The capacities of the three additive auxiliary cups 14a to 14c are ad, 2 ad and 4 ad according to the ratio obtained by $t^{k-1}$ wherein t=2, and k=1, 2, 3.

According to the present example, additive auxiliary cups 14a to 14c having the same capacities as those of the three smaller additive storage cups 4a to 4c are provided. Consequently, a maximum charge weight difference $W_{max}$6.4 ad which is obtained by the structure (system) of the present example can be corrected by the same charge weight difference as that of additive storage cups 4a to 4c.

(EXAMPLE 3)

Figure 6:
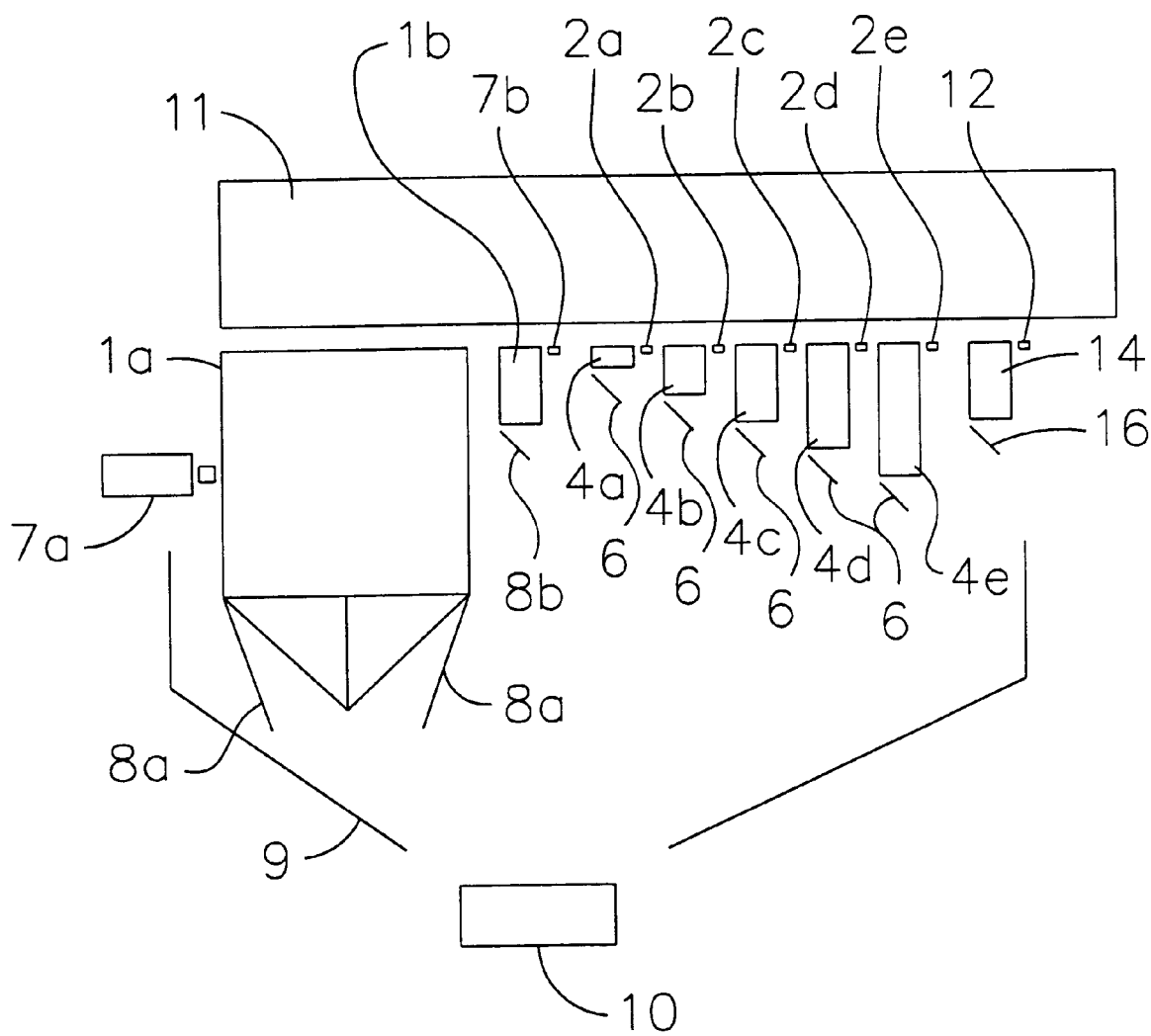
FIG. 6 is a schematic representation showing a third example of a quantitative charging apparatus having a subtractive auxiliary cup according to the present invention.

FIG. 6 is a schematic drawing of a quantitative charging apparatus according to a third example of the present invention. The apparatus of the present example differs from the apparatus shown in FIG. 5 in the following respects. More specifically, the apparatus shown in FIG. 6 has a single additive auxiliary cup 14 including a load cell 12 in place of additive auxiliary cups 14a to 14c, and a large charge storage cup 1 is formed by a main charge storage cup 1a having a gate 8a and a subtractive auxiliary cup 1b having a gate 8b. The articles for large charge are supplied to the main charge storage cup 1a and to the subtractive auxiliary cup 1b separately. The articles fed into the main charge storage cup 1a and the subtractive auxiliary cup 1b are weighed by load cells 7a and 7b. In FIG. 6, the same reference numbers designate the same components as in FIG. 5.

The capacities of additive auxiliary cup 14 and subtractive auxiliary cup 1b are set to the range of +− a whose center is 6.4 a in which the maximum dispersion ratio of the bulk densities of the articles Z=0.2, m=5 and s=2 are substituted for $2dV_{max}=2Zas^{m-1}$. According to the present example, the capacity of additive auxiliary cup 14 and the capacity of the subtractive auxiliary cup 1b are 6.4 a.

Figure 7:
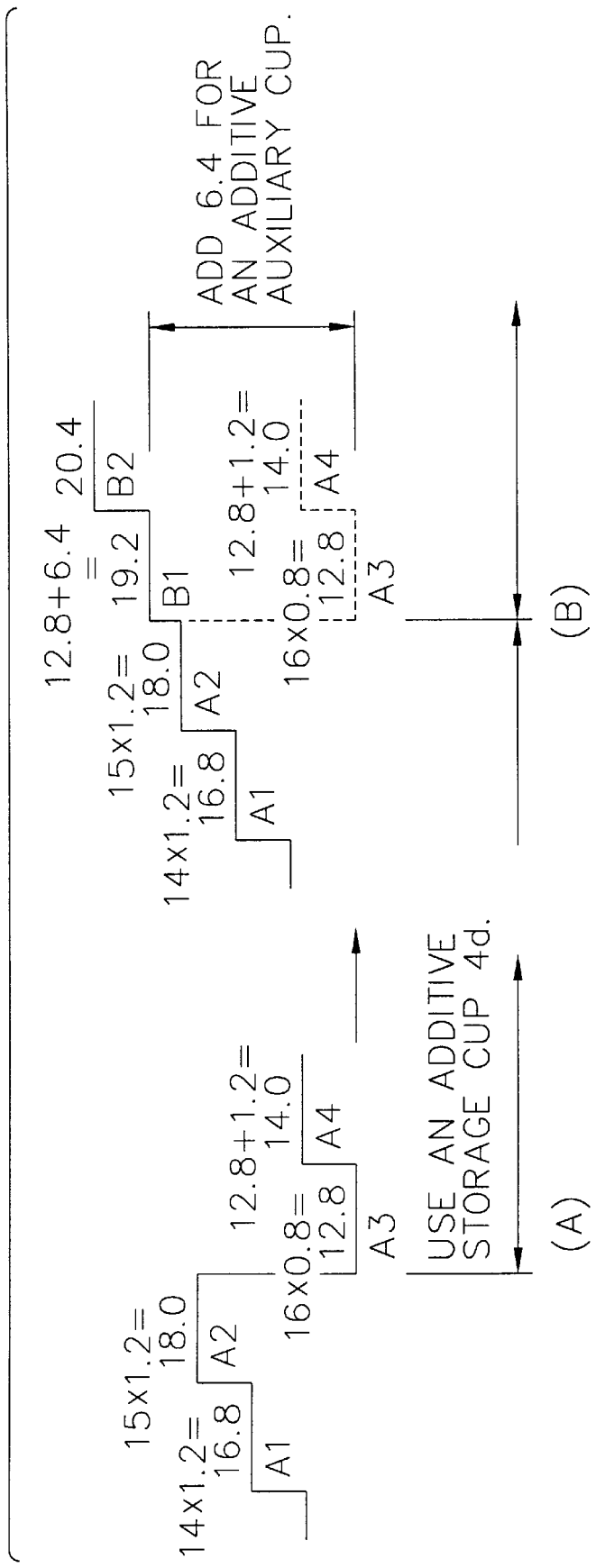
FIG. 7 is a diagram for explaining the function of the additive auxiliary cup.

The functions of additive auxiliary cup 14 and subtractive auxiliary cup 1b will be described below with reference to FIGS. 7 and 8. FIG. 7 shows the case where the articles having the maximum bulk density of 1+Z=1.2 are supplied into the additive storage cups 4a to 4d, and the articles having the minimum bulk density of 1−Z=0.8 are supplied into the additive storage cup 4e. FIG. 7(a) shows the case where the articles for additive charging are increased every minimum unit capacity by changing the combination of additive storage cups. At A1, the additive storage cups 4b to 4d are selected and the articles for additive charging of (2+4+8)×1.2=16.8 ad (a capacity ratio of 14) are prepared. For simplicity, ad is omitted in FIGS. 7 and 8. At A2, the additive storage cup 4a having the minimum unit volume is added and the articles for additive charging have a weight of 18.0 ad (a capacity ratio of 15), which is the total weight of the articles within the additive storage cups 4a to 4d. If the capacity ratio of the articles for the additive charge storage cups are then increased to 16, only the additive storage cup 4e is usually selected. Since articles having the minimum bulk density of 1−Z=0.8 are supplied into the additive storage cup 4e as described above, an additive weight of 12.8 ad (16×0.8=12.8 ad) is obtained at A3. Consequently, the weights of the articles for addition are greatly decreased. According to the present example, the articles within the additive auxiliary cup 14 are added, which provides a total additive weight of 19.2 ad (12.8+6.4=19.2 ad) is obtained as shown by B1 of FIG. 7(b). Thus, a gap (i.e., large step change) in the charge weight difference of the articles for addition can be corrected.

Figure 8:
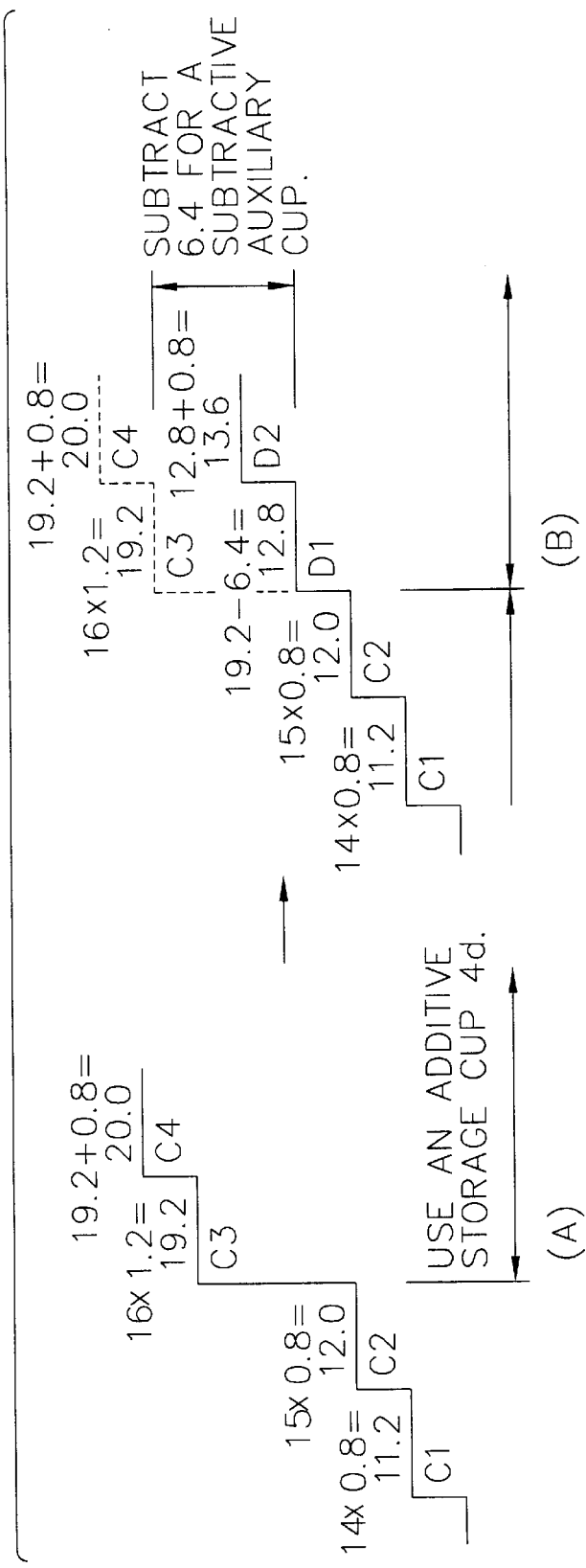
FIG. 8 is a diagram for explaining the function of the subtractive auxiliary cup.
Figure 9:
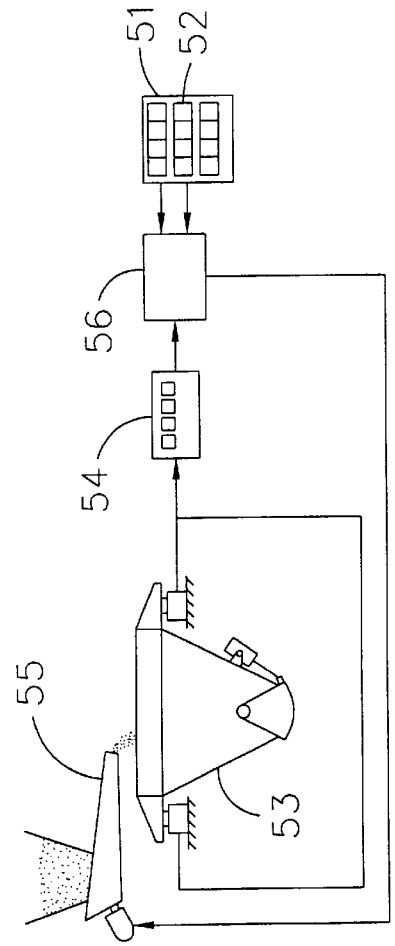
FIG. 9 is a schematic representation showing a quantitative charging apparatus having a vibrational feeder according to the prior art.

FIG. 8 shows the case where the articles having the minimum bulk density of 1−A=0.8 are supplied into the additive storage cups 4a to 4d, and the articles having the maximum bulk density of 1+Z=1.2 are supplied into the additive storage cup 4e. FIG. 8(a) shows the case where the articles for addition are increased every minimum unit capacity by changing the combination of additive storage cups. At C1, the additive storage cups 4b to 4d are selected and the articles for addition of (2+4+8)×0.8=11.2 ad (a capacity ratio of 14) are prepared. At C2, the additive storage cup 4a having the minimum unit volume is added and the articles for addition have a weight of 12.0 ad (a capacity ratio of 15) which is the total weight of the articles within the additive storage cups 4a to 4d. Subsequently, if the capacity ratio of the articles for the additive storage cups is increased to 16, only the additive storage cup 4e is usually selected. Since the articles having the maximum bulk density of 1+Z=1.2 are supplied into the additive storage cup 4e as described above, 16×1.2=19.2 ad is obtained at C3 so that the weights of the articles for addition are greatly increased. According to the present example, if the articles within the subtractive auxiliary cup 1b are not discharged, an additive weight of 12.8 ad (19.2−6.4=12.8 ad) is obtained at D1 shown in FIG. 8(b). Consequently, a gap (i.e., large change) in the charge weight difference of the articles for addition can be corrected.

While five additive storage cups having a capacity ratio of 1:2:4:8:16 have been described in the above example, the present invention is not restricted thereto but can be applied to an apparatus including a plurality of additive storage cups which have at least two different capacities. In addition, the number of the additive auxiliary cups can vary.

While the positive real numbers s and t are 2 in the above example, the present invention is not restricted thereto other integers or decimal numbers can be selected. Furthermore, the positive real numbers s and t, and b and a may be different from each other respectively. In this case, the difference in charging weight which is obtained by only the additive storage cups is not the same as the difference in charge weight which is obtained by adding the additive auxiliary cup.

In the quantitative charging apparatus according to the present invention, the large increase in the charge weight difference caused by changing the bulk densities of the articles supplied into the additive storage cups is corrected by the additive auxiliary cup having the number and capacity corresponding to the gap. This allows the weight to be adjusted finer (more precisely) within a wide range even if the bulk densities of the articles in the storage cups vary.

According to the embodiment of the present invention in which the subtractive auxiliary cup is provided, the articles within the subtractive auxiliary cup are not discharged but held so that the maximum charge weight difference $W_{max}$ can be decreased. Consequently, the weight delivered by the system is very accurate within a wide range.

While the invention has been described in detail, the foregoing description is in all aspects illustrative and not restrictive. It is understood that numerous other modifications and variations can be devised without departing from the scope of the invention.

What is claimed is:

1. A quantitative charging apparatus for delivering quantities of articles with each quantity being of an acceptable weight relative to a target weight $W_o$, said apparatus comprising:

a large charge storage cup provided with weighing means for storing articles having a weight which is smaller than and close to said target weight, a plurality of additive storage cups provided with weighing means, said additive storage cups having at least two different capacities for storing articles for additive charging so as to make up an underweight obtained by subtracting the weight of the articles within said large charge storage cup from said target weight, a control device for selecting a combination of said additive storage cups to stepwise change the weight of said articles for additive charging according to a predetermined charge weight difference, and one or a plurality of additive auxiliary cups provided with weighing means for correcting a gap in said charge weight difference caused by a variation in bulk density of said articles when the combination of said additive storage cups is selected by said control device, said large charge storage cup comprising a main charging storage cup and a subtractive auxiliary cup having respective weighing means, said subtractive auxiliary cup holding articles without discharge so that said charge weight difference is decreased.

2. The quantitative charging apparatus of claim 1 wherein said additive storage cups include at least m additive storage cups having the following capacity:

$$a, as^1, as^2, \ldots, as^{k-1}, \ldots, as^{m-1}$$

a: the capacity of additive storage cup as a reference
   s: a positive real number
   0<k (integer)<=m, m<=the number of said additive storage cups.

3. The quantitative charging apparatus of claim 2 wherein said additive auxiliary cup is a single cup, and said additive auxiliary cup and said subtractive auxiliary cup have capacities which can store the articles having a weight of $(2ZdV_{max}-ad)$ to $(2ZdV_{max}+ad)$ when the maximum volume of said additive storage cups is $V_{max}$, the maximum dispersion ratio of the bulk densities of the articles within said additive storage cups is Z, and the reference value of the bulk density of the articles is d.

4. The quantitative charging apparatus of claim 2 wherein said additive auxiliary cups include at least p additive auxiliary cups having the following capacity.

$$b, bt^1, bt^2, \ldots, bt^{k-1}, \ldots, bt^{p-1}$$

b: the capacity of additive auxiliary cup as a reference
t: a positive real number
0<k (integer)<=p.

5. The quantitative charging apparatus of claim 4 wherein said positive real numbers t and s are equal to each other.

6. The quantitative charging apparatus of claim 5 wherein said positive real numbers t and s are 2.

7. The quantitative charging apparatus of claim 6 wherein when the maximum dispersion ratio of the bulk densities of the articles within said additive storage cups is Z, the maximum volume of said m additive storage cups is $V_{max}$, and the total capacity of said p additive auxiliary cups is A, the number p of said additive auxiliary cups is an integer which satisfies the following equation $$2ZV_{\max} = 2Z2^{m-1}a < A = b\sum_{k=1}^{p} 2^{k-1}.$$

8. The quantitative charging apparatus of claim 2 wherein said additive auxiliary cups include at least p additive auxiliary cups having the following capacity:

$$b, bt^1, bt^2, \ldots, bt^{k-1}, \ldots, bt^{p-1}$$

b: the capacity of additive auxiliary cup as a reference
t: a positive real number
0<k (integer)<=p.

9. The quantitative charging apparatus of claim 8 wherein said positive real numbers t and s are equal to each other.

10. The quantitative charging apparatus of claim 9 wherein said positive real numbers t and s are 2.

11. The quantitative charging apparatus of claim 10 wherein when the maximum dispersion ratio of the bulk densities of the articles within said additive storage cups is Z, the maximum volume of said m additive storage cups is $V_{max}$, and the total capacity of said p additive auxiliary cups is A, the number p of said additive auxiliary cups is an integer which satisfies the following equation:

$$2ZV_{\max} = 2Z2^{m-1}a < A = b\sum_{k=1}^{p} 2^{k-1}.$$

12. The quantitative charging apparatus of claim 1 wherein said control device is operable to select one or more of said additive auxiliary storage cups only when said gap in said charge weight difference exceeds a predetermined amount.

* * * * *